(12) United States Patent
Kim et al.

(10) Patent No.: US 7,665,106 B2
(45) Date of Patent: Feb. 16, 2010

(54) EMERGENCY ALERT SIGNALING METHOD AND DTV RECEIVER

(75) Inventors: Jin Pil Kim, Seoul (KR); Chang Sik Yun, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 638 days.

(21) Appl. No.: 11/583,954

(22) Filed: Oct. 20, 2006

(65) Prior Publication Data

US 2007/0094680 A1 Apr. 26, 2007

(30) Foreign Application Priority Data

Oct. 21, 2005 (KR) ............ 10-2005-0099649

(51) Int. Cl.
*H04N 7/10* (2006.01)
*H04N 7/025* (2006.01)
*H04N 5/445* (2006.01)
*G06F 3/00* (2006.01)
*G06F 13/00* (2006.01)

(52) U.S. Cl. .................. 725/33; 725/32; 725/34; 725/35; 725/38; 725/40

(58) Field of Classification Search ......... 725/32–35, 725/38, 40
See application file for complete search history.

(56) References Cited

U.S. PATENT DOCUMENTS 7,444,657 B2 * 10/2008 Kendall et al. ............ 725/33
7,506,349 B2 * 3/2009 Rodolico .................. 725/33

* cited by examiner

*Primary Examiner*—Hunter B. Lonsberry
(74) *Attorney, Agent, or Firm*—McKenna Long & Aldridge LLP

(57) ABSTRACT

A terrestrial digital television receiver includes a tuner, a microcomputer, and a demodulator. The microcomputer initially determines whether the DTV receiver is on, a power-on or power-off mode. If the DTV receiver is on the power-off mode, the microcomputer, control operation of the tuner to tune to a predefined emergency alert channel to receive a master guide table. The demodulator parses the master guide table. If the parsed master guide table indicates that a new emergency alert message is being received, the microcomputer automatically sets the DTV receiver on the power-on mode and controls operation of the tuner to tune to the emergency alert channel.

40 Claims, 13 Drawing Sheets

FIG. 1

| Syntax | Bits | Description |
|---|---|---|
| table_ID | 8 | value 0xD8 |
| section_syntax_indicator | 1 | '1' |
| zero | 1 | '0' |
| reserved | 2 | '11' |
| section_length | 12 | uimsbf |
| table_id_extension | 16 | '0x0000' |
| reserved | 2 | '11' |
| sequence_number | 5 | uimsbf |
| current_next_indicator | 1 | bslbf |
| section_number | 8 | uimsbf |
| last_section_number | 8 | uimsbf |
| protocol_version | 8 | uimsbf |
| EAS_originator_code | 24 | Three ASCII characters |
| EAS_event_code_length | 8 | uimsbf (N) |
| EAS_event_code | 8*N | N ASCII characters |
| nature_of_activation_text_length | 8 | uimsbf |
| nature_of_activation_text() | var | uimsbf |
| alert_message_time_remaining | 8 | uimsbf range 0~120 |
| event_start_time | 32 | uimsbf |
| event_duration | 16 | uimsbf range 15~6000 |
| reserved | 12 | bslbf |
| alert_priority | 4 | uimsbf |
| details_channel_source | 4 | bslbf |
| reserved | 4 | '1111' |
| details_major_channel_number | 16 | uimsbf |
| details_minor_channel_number | 16 | uimsbf |
| details_carrier_frequency | 32 | uimsbf |
| details_program_number | 8 | uimsbf |

| Syntax | Bits | Description |
|---|---|---|
| details_channel_TSID | 16 | uimsbf |
| alert_text_length | 16 | uimsbf |
| alert_text_rate | 16 | uimsbf |
| alert_text() | var | var |
|  | 8 | uimsbf |
| location_code_count | | |
| for(i=0;i<location_code_count;I++){ | | |
| country_code | 8 | uimsbf 0~255 |
| state_code | 8 | uimsbf 0~99 |
| county_subdivision | 4 | uimsbf 0~9 |
| reserved | 2 | '11' |
| county_code | 10 | uimsbf 0~999 |
| } | | |
| exception_count | 8 | uimsbf |
| for{i=0'I<exception_count;I++}{ | | |
| exception_major_channel_number | 16 | uimsbf |
| exception_minor_channel_number | 16 | uimsbf |
| } | | |
| reserved | 6 | '111111' |
| description_length | 10 | uimsbf |
| for{i=0;I<N;I++}{ | | |
| descriptor() | var | Optional |
| } | | |
| CRC_32 | 32 | |

FIG. 2

| Alert_Priorty | Meaning | Channel Tuning |
|---|---|---|
| 0 | Test Message | X |
| 1~7 | [Reserved] | X |
| 8 | Medium Priority : Message Scrolling | X |
| 8~14 | [Reserved] | X |
| 15 | High Priority : Message Scrolling & EAS Channel Tuning | O |

FIG. 3

| Alert_Priorty | Meaning | Channel Tuning |
|---|---|---|
| 0 | Test Message | X |
| 1~4 | [Reserved] | |
| 5 | Low Priority : Conditional Message Scrolling<br>If EAS operation affects to viewer, no scrolling | X |
| 6~9 | [Reserved] | |
| 10 | Medium Priority : Unconditional Message Scrolling | O, X |
| 11~14 | [Reserved] | |
| 15 | High Priority : Unconditional Message Scrolling & EAS Channel Tuning | O |

FIG. 7

| Syntax | No. of Bits | Fromat |
|---|---|---|
| master_guide_table_section (){ | | |
|   table_id | 8 | 0xC7 |
|   section_syntax_indicator | 1 | '1' |
|   private_indicator | 1 | '1' |
|   Reserved | 2 | '11' |
|   section_length | 12 | Uimsbf |
|   table_id_extension | 16 | 0x0000 |
|   Reserved | 2 | '11' |
|   version_number | 5 | Uimsbf |
|   current_next_indicator | 1 | '1' |
|   section_number | 8 | 0x00 |
|   last_section_number | 8 | 0x00 |
|   protocol_version | 8 | Uimsbf |
|   tables_defined | 16 | Uimsbf |
|   for(i=0; i<tables_defined; i++){ | | |
|     table_type | 16 | Uimsbf |
|     reserved | 3 | '111' |
|     table_type_PID | 13 | Uimsbf |
|     reserved | 3 | '111' |
|     table_type_version_number | 5 | Uimsbf |
|     number_bytes | 32 | Uimsbf |
|     Reserved | 4 | '1111' |
|     table_type_descriptors_length | 12 | Uimsbf |
|     for (k=0; k<N; k++){ | | |
|       descriptor() | | |
|     } | | |
|   } | | |
|   emergency_flag | 1 | Uimsbf |
|   Reserved | 3 | '111' |
|   descriptors_length | 12 | Uimsbf |
|   for (I=0; I<N; I++){ | | |
|     descriptor() | | |
|   } | | |
|   CRC_32 | 32 | rpchof |
| } | | |

FIG. 8

| Syntax | No. of Bits | Fromat |
|---|---|---|
| master_guide_table_section (){ | | |
|     table_id | 8 | 0xC7 |
|     section_syntax_indicator | 1 | '1' |
|     private_indicator | 1 | '1' |
|     Reserved | 2 | '11' |
|     section_length | 12 | Uimsbf |
|     table_id_extension | 16 | 0x0000 |
|     Reserved | 2 | '11' |
|     version_number | 5 | Uimsbf |
|     current_next_indicator | 1 | '1' |
|     section_number | 8 | 0x00 |
|     last_section_number | 8 | 0x00 |
|     protocol_version | 8 | Uimsbf |
|     tables_defined | 16 | Uimsbf |
|     for(i=0; i<tables_defined; i++){ | | |
|         table_type | 16 | Uimsbf |
|         reserved | 3 | '111' |
|         table_type_PID | 13 | Uimsbf |
|         reserved | 3 | '111' |
|         table_type_version_number | 5 | Uimsbf |
|         number_bytes | 32 | Uimsbf |
|         Reserved | 4 | '1111' |
|         table_type_descriptors_length | 12 | Uimsbf |
|         for (k=0; k<N; k++){ | | |
|             descriptor() | | |
|         } | | |
|     } | | |
|     Reserved | 4 | '1111' |
|     descriptors_length | 12 | Uimsbf |
|     for (l=0; l<N; l++){ | | |
|         descriptor() | | |
|     } | | |
|     CRC_32 | 32 | rpchof |
| } | | |

EMERGENCY ALERT SIGNALING METHOD AND DTV RECEIVER

This application claims the benefit of Korean Patent Application No. 10-2005-0099649, filed on Oct. 21, 2005, which is hereby incorporated by reference.

BACKGROUND OF THE INVENTION

1. Field of the Invention

The present invention relates to an emergency alert system, and more particularly, to a method of establishing an emergency alert channel in terrestrial broadcasting, data structure thereof and broadcast receiver thereof. Although the present invention is suitable for a wide scope of applications, it is particularly suitable for newly defining a channel carrying information associated with an emergency and for providing information associated with an emergency to a user quickly and efficiently in the terrestrial broadcasting despite an environmental variation of a terrestrial broadcast receiver.

2. Discussion of the Related Art

Recently, natural disasters including an unexpected earthquake, a flood and the like or emergency situations including a terror, incendiarism and the like are frequently take place. Moreover, damages caused by the natural disaster due to an environmental pollution or by the terror are widely expanded and their spreading effects get more powerful.

In case that the above-illustrated emergency takes place, a terrestrial broadcasting station collects data of the emergency, adjusts the collected data and then sends news relating to the emergency in a format of a newsflash or the like after duration.

In case that the emergency takes place, almost every terrestrial broadcasting station transmits the newsflash to broadcast news associated with the emergency to viewers.

However, in operating the emergency alert system for the emergency in the terrestrial broadcasting, the related art has the following problems.

First of all, all channels of the terrestrial broadcasting simultaneously broadcast the almost similar newsflashes. Hence, it is undesirable in aspect of the efficient management of the terrestrial broadcasting.

Secondly, as mentioned in the above description, if all channels of the terrestrial broadcasting simultaneously broadcast the almost similar newsflashes, viewers located in an area having nothing to do with the emergency are unable to watch regular terrestrial broadcasts.

Thirdly, each broadcasting station collects the news data associated with the emergency at a different speed. Hence, a time point of delivering the news associated with the emergency to a viewer at the first time depends on what kind of channel the viewer is watching.

Fourthly, in case that a power of a terrestrial broadcast receiver is in standby mode or in case that another data input source (e.g., DVD, etc.) is being outputted, it is unable to notify information indicating the emergency occurrence to a user of the terrestrial broadcast receiver.

SUMMARY OF THE INVENTION

Accordingly, the present invention is directed to a method of establishing an emergency alert channel in terrestrial broadcasting, data structure thereof and broadcast receiver thereof that substantially obviate one or more problems due to limitations and disadvantages of the related art.

An object of the present invention is to provide a method of establishing an emergency alert channel in terrestrial broadcasting, data structure thereof and broadcast receiver thereof, by which terrestrial broadcast channels can be efficiently used instead of using the entire terrestrial broadcast channels to deliver news associated with an emergency.

Another object of the present invention is to provide a method of establishing an emergency alert channel in terrestrial broadcasting, data structure thereof and broadcast receiver thereof, by which a regular terrestrial broadcast can be normally sent on the air while emergency information is provided to viewers.

Another object of the present invention is to provide a method of establishing an emergency alert channel in terrestrial broadcasting, data structure thereof and broadcast receiver thereof, by which news associated with an emergency can be quickly provided to all viewers at the same time point regardless of whether a viewer is watching a specific terrestrial broadcast channel.

A further object of the present invention is to provide a method of establishing an emergency alert channel in terrestrial broadcasting, data structure thereof and broadcast receiver thereof, by which information indicating an emergency occurrence can be notified to a user of the terrestrial broadcast receiver in case that a power of a terrestrial broadcast receiver is in standby mode or in case that another data input source (e.g., DVD, etc.) is being outputted.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a terrestrial digital television (DTV) receiver includes a tuner, a microcomputer, and a demodulator. The microcomputer initially determines whether the DTV receive is on a power-on mode or a power-off mode, and controls operation of the tuner to periodically tune to a predefined emergency alert channel to receive a first master guide table when the DTV receiver is one the power-off mode. Under control of the microcomputer, the demodulator parses the first master guide table to determine whether a new emergency alert message is being received. If the parsed first master guide table indicates that the new emergency alert message is being received, the microcomputer automatically sets the DTV receiver on the power-on mode and control operation of the tuner to tune to the emergency alert channel. Then, the tuner further receives a first emergency alert table including the new emergency alert message through the tuned emergency alert channel, and the demodulator parses the new emergency alert message from the parsed table. The terrestrial DTV receiver further may further include a controller controlling operation of a display device in order to scroll the parsed message across a portion of a video screen.

In another aspect of the present invention, a terrestrial digital television (DTV) receiver includes a tuner, a microcomputer, and a demodulator. The microcomputer determines whether the DTV receiver is on a power-on mode or a power-off mode. If the DTV receiver is determined to be on the power-off mode, the microcomputer control operation of the tuner to periodically tune to a predefined emergency alert channel to receive a first emergency alert table. Under control of the microcomputer, the demodulator parses the first emergency alert table to determine whether the first emergency alert table includes a new emergency alert message. If it includes the new message, the microcomputer automatically sets the DTV receiver on the power-on mode and control operation of the tuner to tune to the emergency alert channel. The demodulator then parses the new emergency alert message from the first emergency alert table. The DTV receiver may further include, a controller controlling operation of a display device to scroll the parsed new emergency alert message across a portion of a video screen.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of, the invention. In the drawings:

FIG. 1 is an exemplary diagram of a bit stream syntax of an emergency alert table according to the present invention;

FIG. 2 is an exemplary diagram of a meaning corresponding to an 'alert_priority' field value according to one embodiment of the present invention;

FIG. 3 is an exemplary diagram of a meaning corresponding to an 'alert_priority' field value according to another embodiment of the present invention;

FIG. 7 is a bit stream syntax of MGT (master guide table) according to one embodiment of the present invention;

FIG. 8 is a bit stream syntax of MGT (master guide table) according to another embodiment of the present invention;

DETAILED DESCRIPTION OF THE INVENTION

Figure 4:
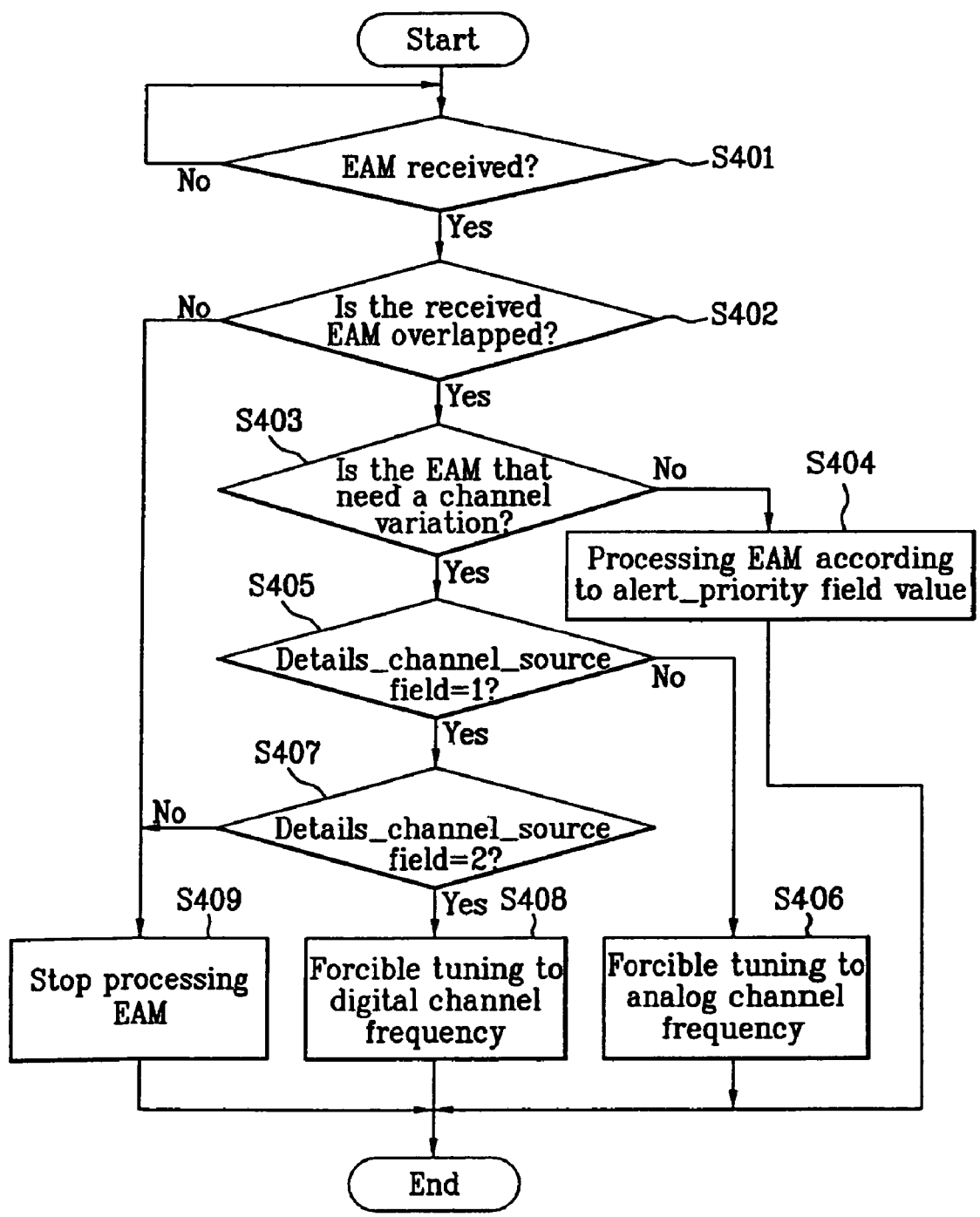
FIG. 4 is a flowchart of a method of deciding whether a broadcast channel carrying an emergency alert message is an analog channel or a digital channel using a 'details_channel_source' field value according to the present invention.

Reference will now be made in detail to the preferred embodiments of the present invention, examples of which are illustrated in the accompanying drawings. Wherever possible, the same reference numbers will be used throughout the drawings to refer to the same or like parts.

First of all, for the clear explanation, 'description about EAT (emergency alert table) for operating an emergency alert system of terrestrial broadcasting', 'description about a method of defining PID (packet identifier) of the EAT', 'description about a method of confirming information of an emergency occurrence using MGT (master guide table)', 'description of a method of tuning to an emergency alert channel in case of confirming the information of the emergency occurrence', and 'description of a method of tuning to an emergency channel or displaying an EAM (emergency alert message) by substantially confirming the information of the emergency occurrence in a terrestrial broadcast receiver' are explained as follows.

FIG. 1 is an exemplary diagram of a bit stream syntax of an emergency alert table according to the present invention.

A bit stream syntax defined in EAT is explained as follows. The present invention is characterized in defining a separate table, which does not exist in conventional terrestrial broadcasting, including information associated with an emergency.

Yet the EAT can be defined in a manner of being newly added to the PSIP protocol of terrestrial broadcasting. It is decided whether an emergency has taken place by transmitting the EAT from a terrestrial broadcasting transmitter and by parsing the transmitted EAT in a terrestrial broadcast receiver.

Syntaxes configuring the EAT, as shown in FIG. 1, are explained one by one as follows. For they clear explanation, double quotation marks will be given to the syntaxes configuring the EAT, respectively.

Referring to FIG. 1, "table_ID" is a syntax indicating that the EAT can be used as a table including information about an emergency alert message of terrestrial broadcasting and can be set to 0xD8 for example.

"section_syntax_indicator" can be set to have a value of 1 and can be used as a syntax meaning to follow a general MPEG-2 section syntax next to a "section_length" field.

"section_length" defines a number of remaining bytes and can be set to a value smaller than 4093.

"sequence_number" can indicate a sequence of an emergency alert message. If the semantic of the message is changed, "sequence_number" can be incremented to a value to 31 from 0. The "sequence_number" field can indicate a version of the emergency alert message.

"current_next_indicator" indicates that a transmittedtable is always applicable and can be set to a value of 1.

"section_number" indicates that the transmitted table occupies a length of at least one section and can be set to 0x00.

"protocol_version" indicates a version value of a PSIP (program and system information protocol).

"EAS_riginator_code" can indicate an entity that activates an EAS (emergency alert system).

"EAS_event_code_length" can indicate a length of "EAS_event_code".

"EAS_event_code" can indicates a type of an EAS and can represent a type of an emergency such as a flood, a terror, an earthquake and the like together with detailed information of the emergency such as a large-scale earthquake, a medium-scale earthquake, a small-scale earthquake and the like for example.

"nature_of_activation_text_length" can indicate a length of "nature_of_activation_text". For instance, if a "nature_of_activation_text length" field value is '0', it can mean that "nature_of_activation_text" is not included in a present emergency alert message.

"nature_of_activation_text" can include a specific syntax representing a textual representation of an event code displayed on a screen.

"alert_message_time_remaining" can indicate a remaining output time of an emergency alert message. For instance, "alert_message_time_remaining" can be set to a unit of 0~120 seconds. A zero value may represent an infinite duration. And, the "alert_message_time_remaining" field can indicate a duration time, which should continue from a time point of rendering an emergency alert message into an interrupt service to a returning time point of the emergency alert, by a unit of seconds.

"event_start_time" can represent a start time of an EAM event by a unit of seconds after 00 hours UTC, Jan. 6, 1980. If the field is a past time by being compared to an STT time of a corresponding channel with reference to a GPS time, a terrestrial broadcast receiver side ignores the EAT. If the filed is a future time, the field value is compared to an "event_duration" field value to decide whether to load the EAT in a memory of the terrestrial broadcast receiver.

"event_duration" is a time to sustain an emergency alert and can employ a unit of minutes. A zero value may mean that the time to sustain the emergency alert is not confirmed. The terrestrial broadcast receiver side can delete a past EAM event, which is stored in the memory of the terrestrial broadcast receiver but is not necessary anymore, using the "event_start_time" field and the "event_duration" field.

And, "alert_priority" can mean a syntax indicating significance or priority of an emergency.

FIG. 2 is an exemplary diagram of a meaning corresponding to an 'alert_priority' field value according to one embodiment of the present invention.

Referring to FIG. 2, if a priority is '0' for example, a terrestrial broadcasting transmitting side can just send a test message. If a priority is '8', information for controlling a message associated with an emergency to be scrolled on a screen of a terrestrial broadcast receiver can be transmitted. If a priority is '15' that means a highest priority, information for controlling a message associated with an emergency to be scrolled on a screen of a terrestrial broadcast receiver is transmitted as well as information for forcibly tuning to a specific channel carrying news associated with the emergency.

Of course, the specific channel can correspond to a previously existing channel of terrestrial broadcasting or to a new frequency channel of terrestrial broadcasting, for example.

Yet, the above-illustrated numerical values are exemplary and are not intended to put limitation of claims of the present invention.

FIG. 3 is an exemplary diagram of a meaning corresponding to an 'alert_priority' field value according to another embodiment of the present invention.

Referring to FIG. 3, if a priority is '0' for example, a terrestrial broadcasting transmitting side can just send a test message. If a priority is '5', a text associated with an emergency alert message is limitedly outputted. For instance, if a user is watching not a terrestrial broadcast but an image outputted from another data input source (e.g., DVD viewing, cable broadcast viewing, etc.) or if a terrestrial broadcast receiver is in a standby mode, the text associated with the emergency alert message is not outputted. This is a priority provided not to FIG. 2 but to FIG. 3. If a degree of an emergency is relatively low and if the terrestrial broadcast receiver is in the standby mode or if another data input source is outputted, it is preferable to a user of the terrestrial broadcast receiver that the text associated with the emergency is not outputted. Hence, the priority is additionally provided.

If a priority is '10', the text associated with the emergency alert message is outputted regardless of a mode of the terrestrial broadcast receiver. If a priority is '15', it means a highest priority. Hence, a message associated with the emergency is scrolled on a screen and it is tuned to a specific channel carrying news associated with the emergency.

Of course, the specific channel can correspond to a previously existing channel of terrestrial broadcasting or to a new frequency channel of terrestrial broadcasting, for example.

Yet, the above-illustrated numerical values are exemplary and are not intended to put limitation of claims of the present invention.

The specific channel carrying the news associated with the emergency will be explained in the descriptions of FIG. 9A and FIG. 9B.

"details_channel_sources" is a field that clearly defines whether a broadcast channel of an emergency alert message is an analog channel or a digital channel. For instance, a channel type of an emergency broadcast, as shown in Table 1, according to a "details_channel_source" field can be defined for example.

If the "details_channel_source" field value is '00' or '11', it can be defined as 'unused'. If the "details_channel_source" is '01', it can be defined as 'analog channel'. If the "details_channel_source" is '10', it can be defined as 'digital channel'. In this case, if a minor channel number is 0, it is facilitated to decide whether an emergency channel is an analog channel or a digital channel according to Table 1.

FIG. 4 is a flowchart of a method of deciding whether a broadcast channel carrying an emergency alert message is an analog channel or a digital channel using a 'details_channel_source' field value according to the present invention. A method of facilitating to identify an analog channel or a digital channel is explained in detail with reference to FIG. 4 as follows.

Referring to FIG. 4, if an emergency alert message is received by a terrestrial broadcast receiver side (S401), it is decided whether the received emergency alert message is overlapped with a previously received emergency alert message (S402). If the currently received emergency alert message is overlapped with the previous emergency alert message in the step S402, the currently received emergency alert message is not processed (S409). If the currently received emergency alert message is not overlapped with the previous emergency alert message in the step S302, it is decided whether the currently received emergency alert message is an emergency alert message that needs a forcible switching to an emergency broadcast channel (S403).

If it is decided that the currently received emergency alert message is not the emergency alert message that needs the forcible switching to the emergency broadcast channel in the step S403, the received emergency alert message is processed according to a "alert_priority" field value (S404).

If it is decided that the currently received emergency alert message is the emergency alert message that needs the forcible switching to the emergency broadcast channel in the step S403, it is decided whether a "details_channel_source" field value is 1 (S405). Of course, the numerical value is just exemplary.

If the "details_channel_source" field value is, 1 in the step S405, the broadcast channel decided as the analog channel and is then forcibly tuned to a physical channel frequency of a terrestrial analog channel corresponding to an emergency broadcast channel configured with a major channel number (details_major_channel number) (S406).

If the "details_channel_source" field value is not 1 (=01) in the step S405, it is decided again whether the "details_channel_source" field value is 2 (=10) (S407). Of course, the numerical values are just exemplary.

If "details_channel_source" field value is 2 in the step S407, the broadcast channel is decided as the digital channel and is then forcibly tuned to a physical channel frequency of a terrestrial digital channel corresponding to an emergency broadcast channel obtained by parsing a major channel number field (details_major_channel_numbered) and a minor channel number (details_minor_channel_number) field (S408).

Yet, if a minor channel number is 0, it is the digital channel represented as one-part. If the minor channel number is not 0, it may be the digital channel represented as two-part.

If it is decided that the "details_channel_source" field value is neither 1 nor 2, it means that an error or the like takes place. Hence, a processing of the emergency alert message is stopped (s409).

"details_major_channel_number" is used as a field indicating a major channel number associated with details channel.

"details_minor_channel_number" is used as a field indicating a minor channel number associated with details channel.

"details_carrier_frequency" is used as a field indicating a physical channel number of a channel to be forcibly tuned in case of an emergency occurrence.

"details_channel_program_number" is used as a field indicating a program number of a channel to be forcibly tuned in case of an emergency occurrence.

"details_channel_TSID" is used as a field indicating ID (identifier) of a transport stream of a channel to be forcibly tuned in case of an emergency occurrence.

"alert_text_length" is used as a field indicating a total byte number of an "alert_text( )" field. For instance, if an "alert_text_length" field value is 0, it can be indicated that the "alert_text( )" field is not included in an emergency alert message.

An "alert_text_rate" field is used as a field indicating a scroll speed of scroll data parsed in the "alert_text( )" field, i.e., a scroll speed of an emergency alert content. For instance, a speed enabling a viewer to recognize the scroll data optimally can be determined with reference to a size of data to be scrolled (i.e., "alert_text_length" field value) and an emergency alert message duration time (i.e., "alert_message_time_remaining" field value).

The "alert_text_rate" field includes information for setting a scroll speed of text including an emergency alert message differently according to a field (e.g., "alert_priority") value indicating the significance of the emergency.

For instance, sixteen bits are allocated to the "alert_text_rate" field and the scroll speed is represented as an unsigned integer number (uimsbf). In particular, the scroll speed can describe a time by a unit of seconds from an initial scroll of a first character until the character disappears from a screen or a time by a unit of seconds from an initial scroll of a first character until a last character ends its scroll.

The "alert_text( )" field has a data structure including a specific syntax (e.g., "multiple_string_structure( )", etc.) representing a textual description of an emergency alert on an OSD (on screen display). An emergency alert text can be set to be slowly scrolled from a lower side to an upper side or from a right side to a left side on a screen of a terrestrial broadcast receiver for example.

"location_code_count" is used as a field for counting a region definition coming along a 'for loop' syntax. For instance, the "location_code_count" field can have an integer number between 1~31.

In the region definition, a region name according to an administrative district division in U.S.A is exemplarily used. Yet, claims of the present invention are not limited to the detailed region name.

"country_code" is used as a field for defining a code of a country associated with an emergency. For instance, eight bits can be allocated to the "country_code" field.

The 8-bit "country_code" can indicate 256 countries theoretically, which is enough to specify all the 210~220 currently existing countries. Of course, eight bits are exemplarily allocated to the "country_code" field. Hence, more or less than 8 bits can be allocated to the "country_code" field, which is a designer's option.

"state_code" is used as a field indicating a state or territory associated with an emergency. For instance, with values between 0~99, the "state_code" field can be coded according to a state and an FIPS number code. If the field value is 0, it can indicate an emergency of all states.

"country_subdivision" is used as a field defining a county subdivision and includes 4-bit numerals between 0~9.

"county_code" is used as a field indicating a specific county of the state associated with the emergency and has a value between 0~999. The "county_code" can be coded according to a state and an FIPS number code of an area. If the field value is 0, it can indicate an emergency of all counties.

"exception_major_channel_number", which is not 0, is used as a field indicating a major channel number of an exception service associated with an in-band SI.

"exception_minor_channel_number", which is not 0, is used as a field indicating a minor channel number of an exception service associated with an in-band SI.

In a embodiment of the present invention, a method of defining a PID (packet identifier) of the above-explained EAT. Yet, the PID of the EAT is an packet ID necessary for identifying the EAT from other tables.

Figure 5:
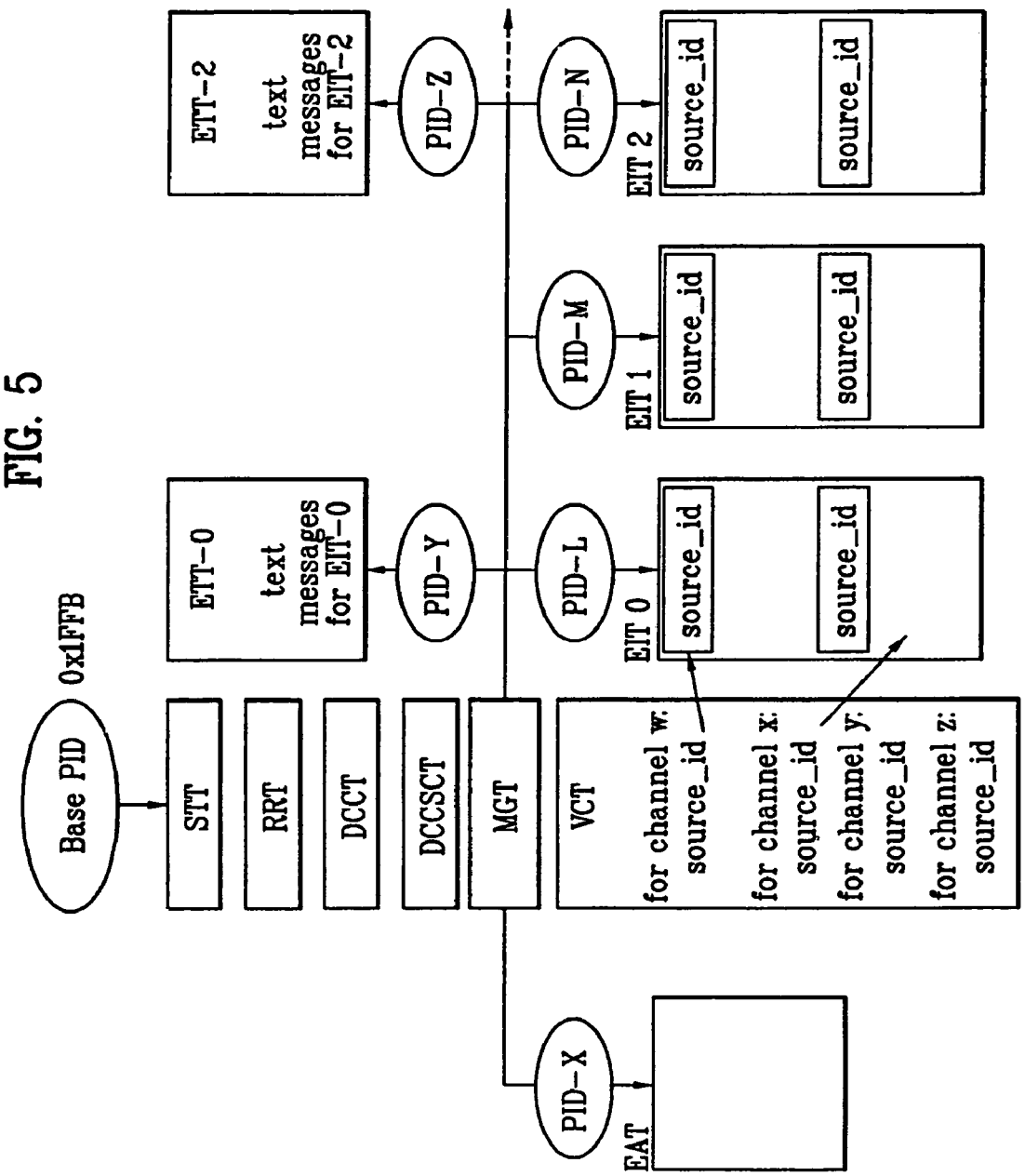
FIG. 5 is a diagram of a PSIP table hierarchy structure including EAT (emergency alert table) according to one embodiment of the present invention.

FIG. 5 is a diagram of a PSIP table hierarchy structure including EAT (emergency alert table) according to one embodiment of the present invention and FIG. 5 is a diagram of a PSIP table hierarchy structure including EAT (emergency alert table) according to another embodiment of the present invention. Two kinds of methods of defining a PID of EAT are explained with reference to FIG. 5 and FIG. 6 as follows.

A first method, as shown in FIG. 5, is to set a PID of EAT to be dependent on MGT. In this case, a terrestrial broadcast receiver side reads out an EZT not by directly checking the EAT among numerous tables of PSIP data but by checking a PID defined by the MGT.

Yet, the MGT (master guide table) is set as a table that defines sizes, PIDs (packet identifiers), version numbers of associated specific tables.

For reference, an STT (system time table) is a table including time information necessary for an application of synchronization. An RRT (rating region table) defines a rating table valid for another region or country. And, a VCT (virtual channel table) provides a table for a virtual channel associated with navigation and tuning.

Moreover, a DCCT (directed channel change table) provides a table associated with information indicating that a terrestrial broadcast receiver is switched to a specific virtual channel at a specific time point of a specific situation. Besides, a DCCSCT (directed channel change selection code table) provides a table associated with information for permitting extensions of a basic category and a location code.

Figure 6:
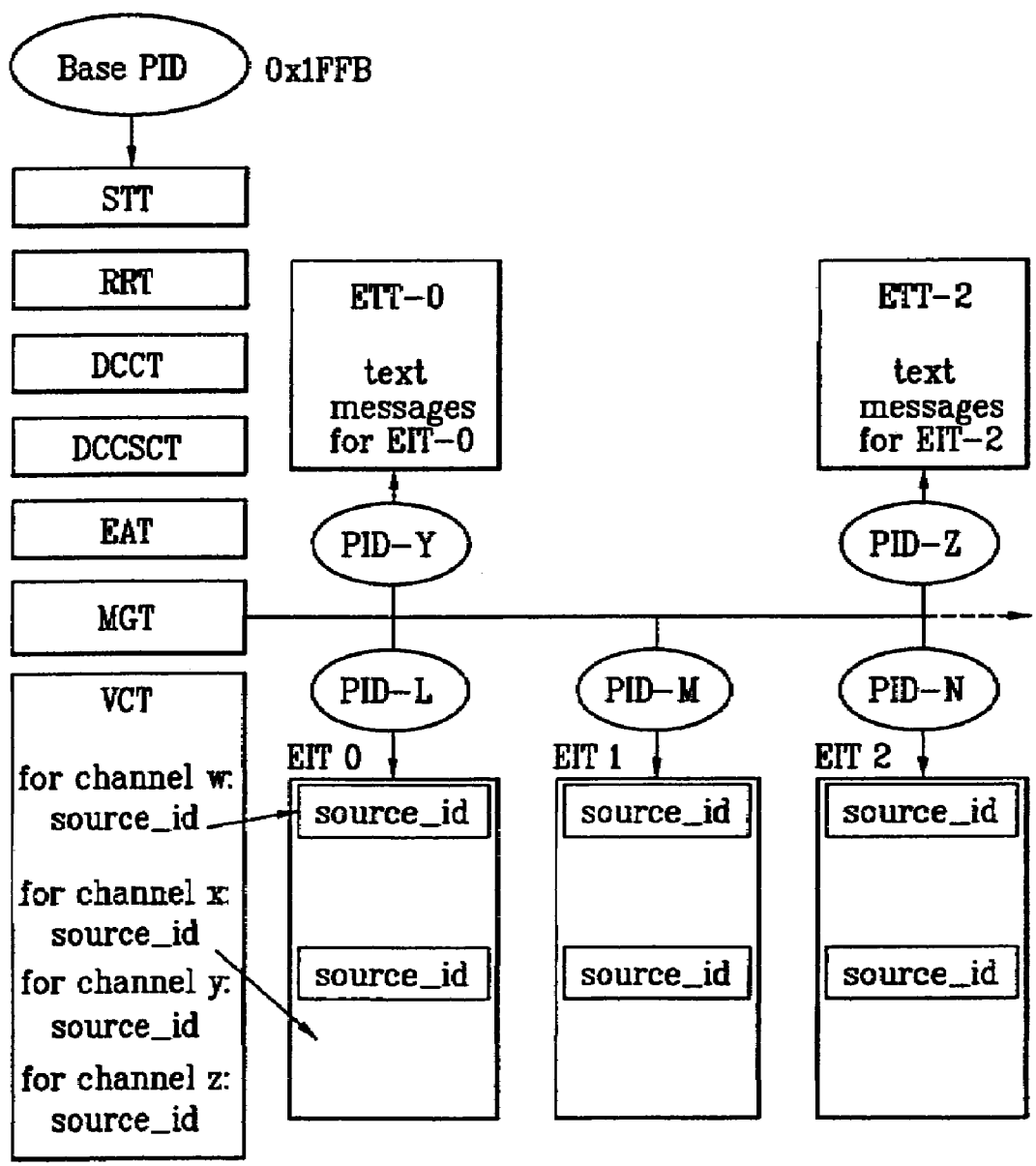
FIG. 6 is a diagram of a PSIP table hierarchy structure including EAT (emergency alert table) according to another embodiment of the present invention.

A second method, as shown in FIG. 6, is to set to a base PID independent from an MGT to have a fixed value. For instance, the base ID can be fixed to a value of 0x1FFB. In this case, unlike FIG. 4, it is advantageous that the EAT can be identified without checking PIDs of the MGT one by one.

Information indicating that an emergency has taken place is transmitted from a terrestrial broadcast transmitting side to a terrestrial broadcast receiver. And, the terrestrial broadcast receiver side should confirm the information indicating that the emergency has taken place.

To confirm the information indicating that the emergency has taken place, two kinds of tables are proposed, which will be explained with reference to FIG. 7 and FIG. 8 later.

FIG. 7 is a bit stream syntax of MGT (master guide table) according to one embodiment of the present invention. An MGT bit stream syntax according to the present invention is explained with reference to FIG. 7 as follows.

First of all, to explain the MGT, a PSIP is simply explained as follows.

PSIP is an abbreviation of program and system information protocol, means a broadcasting protocol for transmitting channel and broadcast program guide information, and defines tables such as STT (system time table), RRT (rating region table), VCT (virtual channel table), MGT (master guide table) and the like.

In particular, the MGT means a table that defines sizes, PIDs (packet identifiers), version numbers and the like of all tables associated with the PSIP.

For the third embodiment of the present invention, a portion of a reserved field in a bit stream syntax of MGT is used as an emergency flag. Yet, the emergency flag (emergency_flag) includes information notifying whether an emergency has taken place from a terrestrial broadcast transmitting side.

For instance, one bit, as shown in FIG. 7, is allocated to the emergency flag (emergency_flag). Of course, claims of the present invention are not limited to one-bit. If necessary, more bits can be allocated to the emergency flag (emergency_flag).

If the terrestrial broadcast transmitting side transmits an MGT by setting the emergency flag (emergency_flag) to '0', a terrestrial broadcast receiver side checks that the emergency flag (emergency_flag) of the received MGT is '0' and then confirms the emergency has taken place. Of course, the numerical value is just exemplary.

In this case, despite a channel that is being watched by a user, the terrestrial broadcast receiver side automatically tunes the channel to an emergency channel or an emergency alert channel.

Yet, the emergency alert channel will be explained in detail in the descriptions of FIG. 9A and FIG. 9B later.

Meanwhile, if the terrestrial broadcast transmitting side transmits an MGT by setting the emergency flag (emergency_flag) to '1', the terrestrial broadcast receiver side checks that the emergency flag (emergency_flag) of the received MGT is '1' and then confirms a normal state that the emergency has not taken place. Of course, the numerical value is just exemplary.

In this case, the automatic channel tuning process to the emergency channel is not executed but a normal broadcast image, which is being watched by a viewer, is outputted.

Of course, the illustrated numerical values '0' and '1' are just exemplary. If necessary, different numerical values are used or '0' and '1' are switched to each other.

In addition, the following method can be taken into consideration. Namely, according to a value of the emergency flag (emergency_flag), it is set to parse a lately received EAT/EAM not to forcibly tune to the emergency channel in direct. In this case, according to a content of the parsed EAT/EAM, such an operation as a tuning to an emergency channel, an emergency-associated text output and the like is controlled.

FIG. 8 is a bit stream syntax of MGT (master guide table) according to another embodiment of the present invention. A bit stream syntax of MGT (master guide table) according to another embodiment of the present invention is explained with reference to FIG. 8 as follows. Yet FIG. 8 differs from FIG. 7 in that a separate emergency flag (emergency_flag) is not employed.

In 'for loop' syntax shown in FIG. 8, an EAT (emergency alert table) is newly defined in direct. For instance, a size, PID, version number and the like of the EAT can be defined by an MGT. In particular, the version number of the EAT can correspond to "sequence_number" shown in FIG. 1. Yet, the "sequence_number" has been explained in the foregoing description, of which detailed explanation is skipped in the following.

For instance, in case that a new emergency has taken place, a terrestrial broadcast transmitting side transmits an EAT including "sequence_number" having a varied value to a terrestrial broadcast receiver. If the "sequence_number" is varied, the terrestrial broadcast transmitting side transmits an MGT including "version_number" having a varied value to the terrestrial broadcast receiver as well.

The terrestrial broadcast receiver confirms that the "version_number" of the MGT is varied and then decides that a new EAT or EAM was received.

Moreover, in accordance with the specific content of the EAT, such an operation as a tuning to an emergency channel, an emergency-associated text output and the like is carried out.

Of course, as mentioned in the foregoing description, a content associated with an emergency can be grasped by parsing EAT after completion of parsing MGT. Instead of defining an EAT from an MGT, a method of defining an EAT independently can be taken into consideration. According to the later method, by parsing the EAT in direct regardless of the MGT, a terrestrial broadcast receiver acquires information associated with an emergency.

Meanwhile, the emergency alert channel will be explained in detail in the descriptions of FIG. 9A and FIG. 9B later. Yet, the details of the EAT are explained in the description of FIG. 1, which will be omitted in the following description.

In terrestrial broadcasting, as a method of providing information associated with an emergency, the method of tuning the channel of the terrestrial broadcast receiver to the emergency alert channel automatically using the EAT (emergency alert table) or MGT (master guide table) in case of the emergency occurrence is already explained in the foregoing description.

Yet, in a fourth embodiment of the present invention, the emergency alert channel is defined more clearly. And, a method of registering the emergency alert channel to the terrestrial broadcast receiver and a process of tuning to the emergency alert channel according to a mode of the terrestrial broadcast receiver are explained in detail as follows.

First of all, the emergency alert channel means a channel of a specific broadband to transmit a broadcast having a content that indicates an occurrence, a variation status and the like of an emergency.

In defining the emergency alert channel, various methods are taken into consideration.

First of all, the emergency alert channel is designated using a new physical channel that is not assigned to conventional broadcasting stations.

Each conventional terrestrial broadcasting station uses a physical channel assigned by FCC (Federal Communications Commission). One of the physical channels except the channels assigned to the conventional terrestrial broadcasting stations is established as the emergency alert channel. It is a matter of course that at least one or more emergency alert channels can be established.

Secondly, a physical channel, which is assigned to a conventional broadcasting station but is not used at all, is established as the emergency alert channel.

Thirdly, at least one or more virtual channels among physical channels assigned to a conventional terrestrial broadcasting station are used as the emergency alert channel.

If it is difficult to establish a new physical channel as an emergency alert channel, at least one virtual channel is added to a physical channel used by a conventional terrestrial broadcasting station to use the added virtual channel as the emergency alert channel. The third method is advantageous in utilizing the conventional broadcasting facilities but is applicable to digital broadcasting only.

Fourthly, unlike the above-explained first to third methods, a previously used channel itself is used as the emergency alert channel.

In case that the emergency alert channel is, established in the above manner, a method of registering an emergency alert channel to a terrestrial broadcast receiver is explained as follows.

First of all, as a first method, the established emergency alert channel is registered to the terrestrial broadcast receiver in the process of manufacturing a terrestrial broadcast receiver product.

Secondly, as a second method, after an EAT and the like have been received from a terrestrial broadcasting station and the like, the established emergency alert channel is registered to the terrestrial broadcast receiver using the EAT and the like.

Thirdly, by inputting the established emergency alert channel via a user input unit such as a remote controller and the like, the emergency alert channel is registered to the terrestrial broadcast receiver.

Figure 9A:
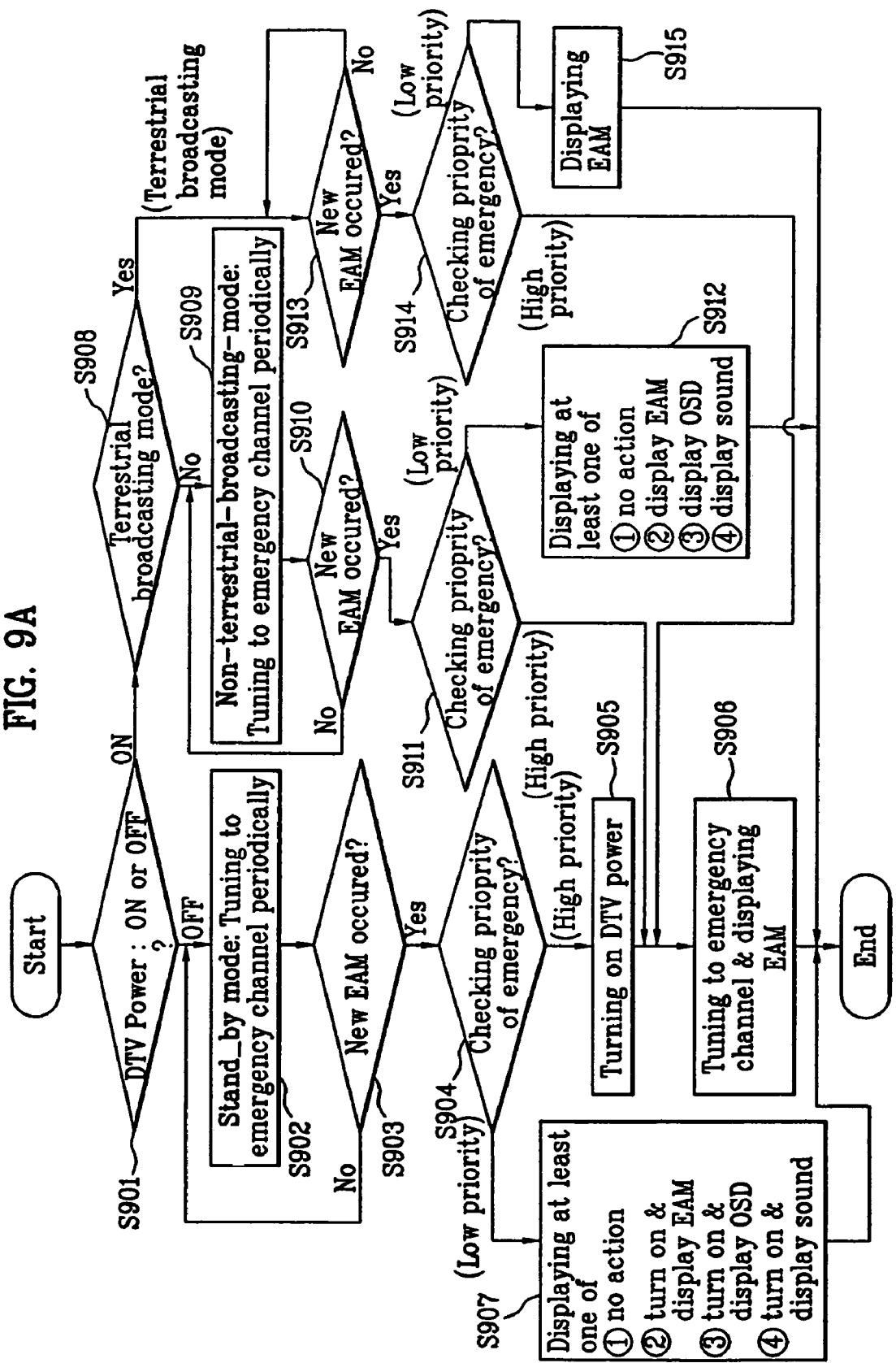
FIG. 9A is a flowchart of a method of establishing an emergency alert channel in terrestrial broadcasting according to one embodiment of the present invention.

FIG. 9A is a flowchart of a method of establishing an emergency alert channel in terrestrial broadcasting according to one embodiment of the present invention. A process of tuning to an emergency alert channel is varied according to a mode of a terrestrial broadcast receiver is explained with reference to FIG. 9A as follows.

Referring to FIG. 9A, it is decided whether a power of a terrestrial broadcast receiver is turned on or off (S901). The terrestrial broadcast receiver corresponds to a video device capable of receiving broadcast signals of terrestrial broadcasting and the like. And, the terrestrial broadcast receiver includes a DTV or the like for example.

As a result of the decision (S901), if the power of the terrestrial broadcast receiver is turned off and if the terrestrial broadcast receiver is in a standby mode, the terrestrial broadcast receiver is tuned to an emergency alert channel each predetermined cycle (S902). Yet, if the power of the terrestrial broadcast receiver is turned off, it means that the power of the terrestrial broadcast receiver is not turned on despite plugging in.

By checking an MGT (master guide table) and an EAT (emergency alert table) transmitted over the emergency alert channel or by checking the EAT only, it is decided whether an EAM (emergency alert message) of a new version is received (S903).

In particular, by checking "sequence_number" shown in FIG. 1, it is decided whether a new emergency takes place. Yet, the "sequence_number" is explained in detail in the description of FIG. 1, of which detailed explanation is skipped in the following.

As a result of the decision (S903), if an EAM of a new version is received, a priority of an emergency is decided (S904). The priority is decided using "alert_priority" among the syntaxes of the EAT shown in FIG. 1 for example.

As a result of the decision (S904), if the priority, of the emergency is relatively high, e.g., if the priority in FIG. 3 is '5 (high priority)', the power of the turned-off terrestrial broadcast receiver, is turned on (S905), the terrestrial broadcast receiver is tuned to the emergency alert channel, and a text message associated with the emergency is displayed (S906).

Otherwise, as a result of the decision (S904), if the priority of the emergency is relatively low, e.g., if the priority in FIG. 3 is '5 (high priority)', no action is taken, news associated with the emergency is displayed in a text format while the power of the turned off terrestrial broadcast receiver is turned on, or an OSD (on screen display) image confirming whether to tune the terrestrial broadcast receiver to the emergency alert channel is outputted (S907).

Of course, the above actions can be set to be independently executed or at least two of the above actions can be set to be executed together.

Meanwhile, as a result of the decision (s901), if the power of the terrestrial broadcast receiver is turned on, it is decided whether the terrestrial broadcast receiver is in a mode of receiving terrestrial broadcasting (S908).

As a result of the decision (S908), if the terrestrial broadcast receiver is not in the mode of receiving the terrestrial broadcasting, the terrestrial broadcast receiver is tuned to the emergency alert channel each cycle (S909). For instance, the mode of not receiving the terrestrial broadcasting means a case of receiving to output cable broadcasting, Internet broadcasting and the like via the terrestrial broadcast receiver or a case of receiving to output A/V data from an external device such as DVD player and the like.

By checking an MGT (master guide table) and an EAT (emergency alert table) transmitted over the emergency alert channel or by checking the EAT only, it is decided whether an EAM (emergency alert message) of a new version is received (S910).

In particular, by checking "sequence_number" shown in FIG. 1, it is decided whether a new emergency takes place. Yet, the "sequence_number" is explained in detail in the description of FIG. 1, of which detailed explanation is skipped in the following.

As a result of the decision (S910), if an EAM of a new version is received, a priority of an emergency is decided (S911). The priority is decided using "alert_priority" among the syntaxes of the EAT shown in FIG. 1 for example.

As a result of the decision (S911), if the priority of the emergency is relatively high, the terrestrial broadcast receiver is forcibly tuned to the emergency alert channel and a text message associated with the emergency is displayed (S906).

Otherwise, as a result of the decision (S911), if the priority of the emergency is relatively low, no action is taken, news associated with the emergency is displayed in a text format, a simple or complicated alarm sound is outputted, or an OSD (on screen display) image confirming whether to tune the terrestrial broadcast receiver to the emergency alert channel is outputted (S912).

Of course, the above actions can be set to be independently executed or at least two of the above actions can be set to be executed together by considering an environment and the like.

As a result of the decision (S908), if the terrestrial broadcast receiver is in the mode of receiving the terrestrial broadcasting, by checking an MGT (master guide table) and an EAT (emergency alert table) transmitted over the emergency alert channel or by checking the EAT only, it is decided whether an EAM (emergency alert message) of a new version is received (S913).

In particular, by checking "sequence_number" shown in FIG. 1, it is decided whether a new emergency takes place. Yet, the "sequence_number" is explained in detail in the description of FIG. 1, of which detailed explanation is skipped in the following.

Yet, it is unnecessary to periodically tune the terrestrial broadcast receiver to the emergency alert channel. If the MGT, EAT and the like are implemented to be transmitted from all terrestrial broadcasting stations together with broadcast signals, the terrestrial broadcast receiver can receive the EAT, MGT and the like without being tuned to the emergency alert channel periodically.

Of course, in the step S902 or S909, the MGT, EAT and the like are set to be transmitted over the emergency alert channel.

As a result of the decision (S913), if an EAM of a new version is received, a priority of an emergency is decided (S914). The priority is decided using "alert_priority" among the syntaxes of the EAT shown in FIG. 1 for example.

As a result of the decision (S914), if the priority of the emergency is relatively high, the terrestrial broadcast receiver is forcibly tuned to the emergency alert channel and a text message associated with the emergency is displayed (S906).

Otherwise, as a result of the decision (S914), if the priority of the emergency is relatively low, news associated with the emergency is displayed in a text format (S915).

Yet, in case of configuring the MGT like FIG. 7, it is described that the emergency occurrence can be decided using the emergency flag (emergency_flag) of the MGT only. In particular, if one bit is allocated to the emergency flag for example, a presence or non-presence of the emergency occurrence can be decided. Hence, FIG. 9A can be modified into FIG. 9B.

Figure 9B:
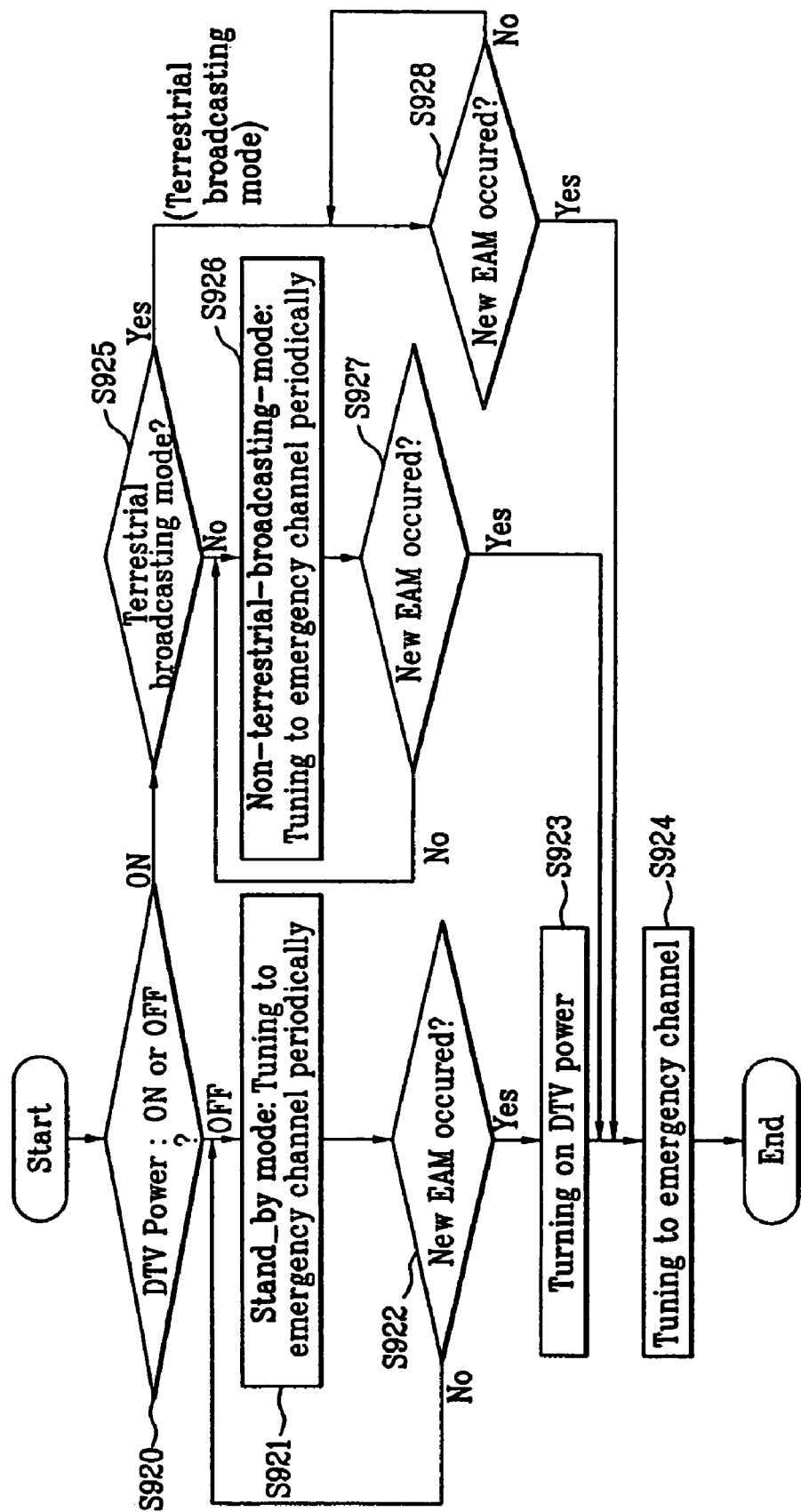
FIG. 9B is a flowchart of a method of establishing an emergency alert channel in terrestrial broadcasting according to another embodiment of the present invention.

Compared to FIG. 9A, FIG. 9B is characterized in that there is no process that an action of the terrestrial broadcast receiver is varied according to a priority of an emergency.

Referring to FIG. 9B, it is decided whether a power of a terrestrial broadcast receiver is turned on or off (S920). The terrestrial broadcast receiver corresponds to a video device capable of receiving broadcast signals of terrestrial broadcasting and the like. And, the terrestrial broadcast receiver includes a DTV or the like for example.

As a result of the decision (S920), if the power of the terrestrial broadcast receiver is turned off and if the terrestrial broadcast receiver is in a standby mode, the terrestrial broadcast receiver is tuned to an emergency alert channel each predetermined cycle (S921). Yet, if the power of the terrestrial broadcast receiver is turned off, it means that the power of the terrestrial broadcast receiver is not turned on despite plugging in.

Subsequently, an MGT (master guide table), and more particularly, an emergency flag ("emergency_flag") transmitted over the emergency alert channel is checked (S922). The step S922 can be easily understood with reference to FIG. 7.

As a result of the check (S922), if the emergency flag indicates information indicating that the emergency has substantially taken place, the power of the terrestrial broadcast receiver is turned on (S923) and the terrestrial broadcast receiver is tuned to the emergency alert channel automatically (S924).

Meanwhile, as a result of the decision (S920), if the power of the terrestrial broadcast receiver is turned on, it is decided whether the terrestrial broadcast receiver is in a mode of receiving to output terrestrial broadcasting (S925).

As a result of the decision (S925), if the terrestrial broadcast receiver is not in the mode of receiving to output the terrestrial broadcasting, the terrestrial broadcast receiver is tuned to the emergency alert channel each predetermined cycle (S926).

For instance, the mode of not receiving the terrestrial broadcasting means a case of receiving to output cable broadcasting, Internet broadcasting and the like via the terrestrial broadcast receiver or a case of receiving to output A/V data from an external device such as DVD player and the like.

The MGT (master guide table), and more particularly, the emergency flag ("emergency_flag") transmitted over the emergency alert channel is checked (S927). Yet, the step (S927) can be easily understood with reference to FIG. 7.

As a result of the check (S927), if the emergency flag includes the information indicating that the emergency has substantially taken place, the terrestrial broadcast receiver is automatically tuned to the emergency alert channel (S924).

Meanwhile, as, a result of the decision (S925), if the terrestrial broadcast receiver in the mode of receiving to output the terrestrial broadcasting, the MGT (master guide table), and more particularly, the emergency flag ("emergency_flag") is checked (S928). Yet, the step (S927) can be easily understood with reference to FIG. 7.

Yet, it is unnecessary to periodically tune the terrestrial broadcast receiver to the emergency alert channel. If the MGT and the like are implemented to be transmitted from all terrestrial broadcasting stations together with broadcast signals, the terrestrial broadcast receiver can receive the MGT and the like without being tuned to the emergency alert channel periodically.

Of course, in the step S921 or S926, the MGT and the like are set to be transmitted over the emergency alert channel.

As a result of the check (S928), if the emergency flag includes the information indicating that the emergency has substantially taken place, the terrestrial broadcast receiver is automatically tuned to the emergency alert channel (S924).

Figure 10:
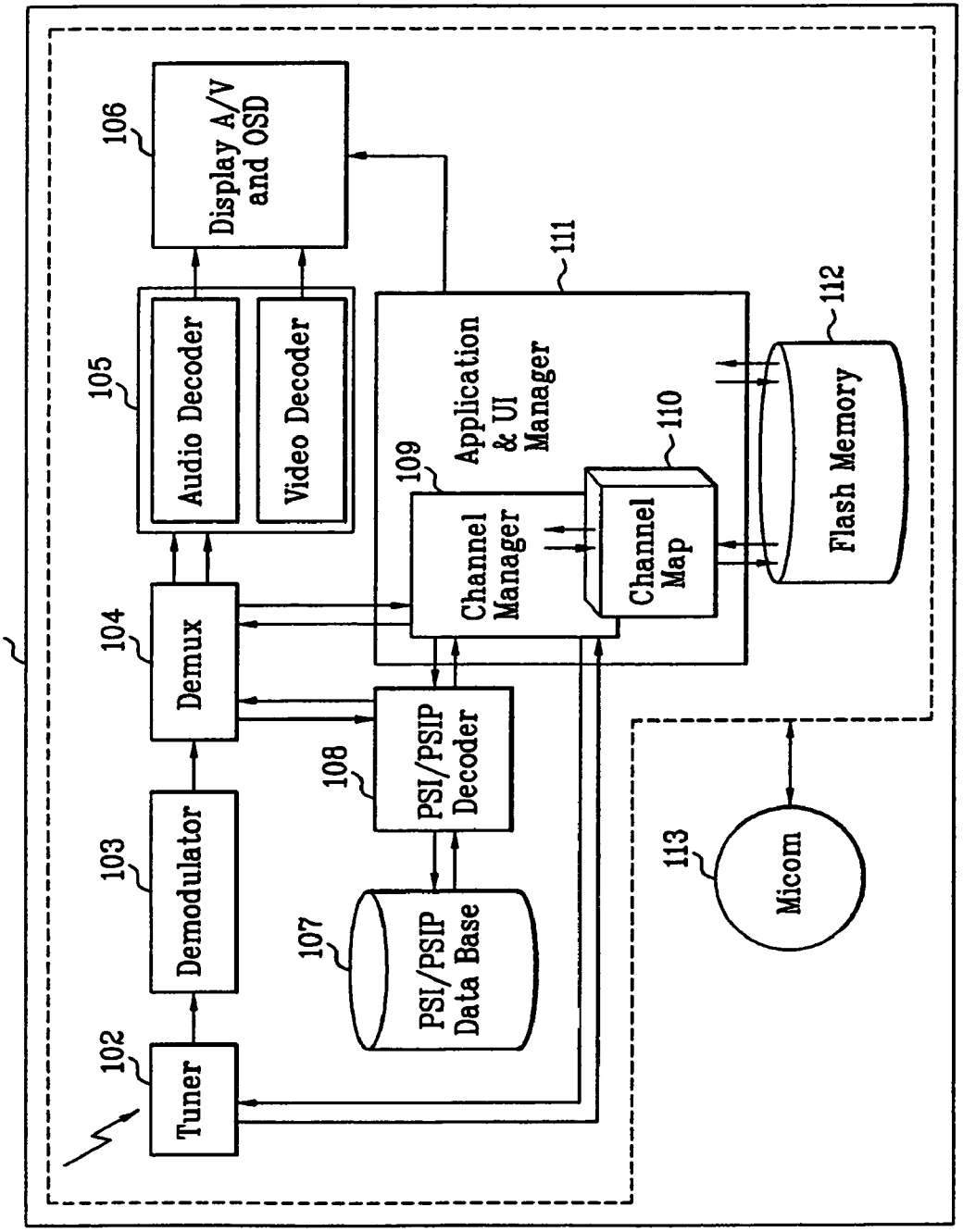
FIG. 10 is a block diagram of a terrestrial broadcast receiver according to the present invention.

FIG. 10 is a block diagram of a terrestrial broadcast receiver according to the present invention.

Figure 11A:
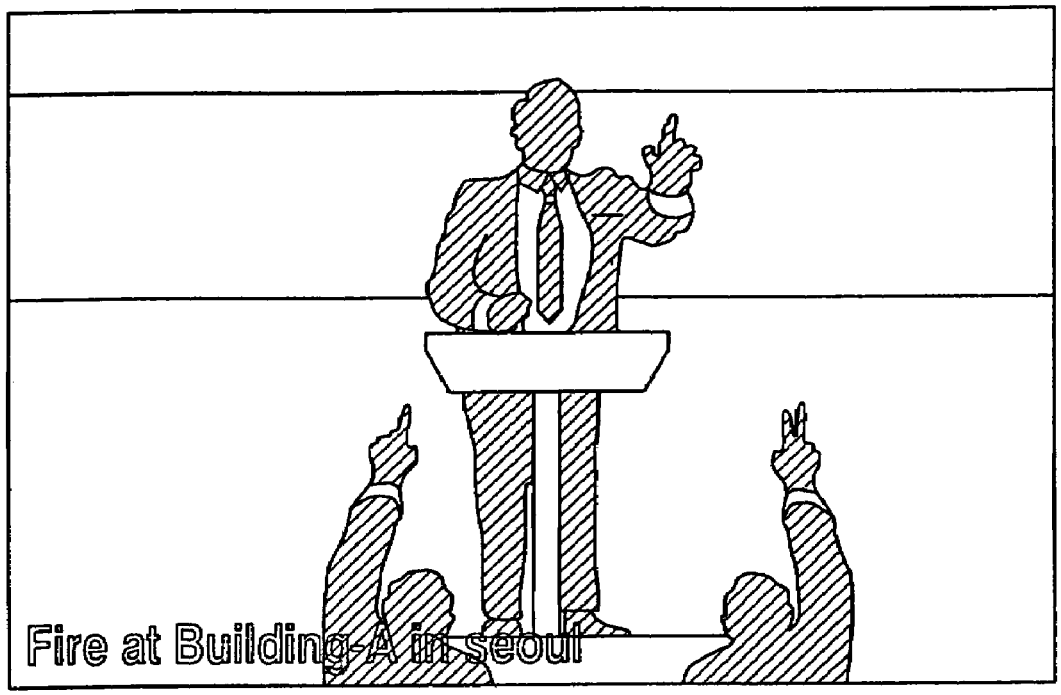
FIG. 11A is a diagram of an displayed image of an emergency alert message according to one embodiment of the present invention.

FIG. 11A is a diagram of an displayed image of an emergency alert message according to one embodiment of the present invention.

Figure 11B:
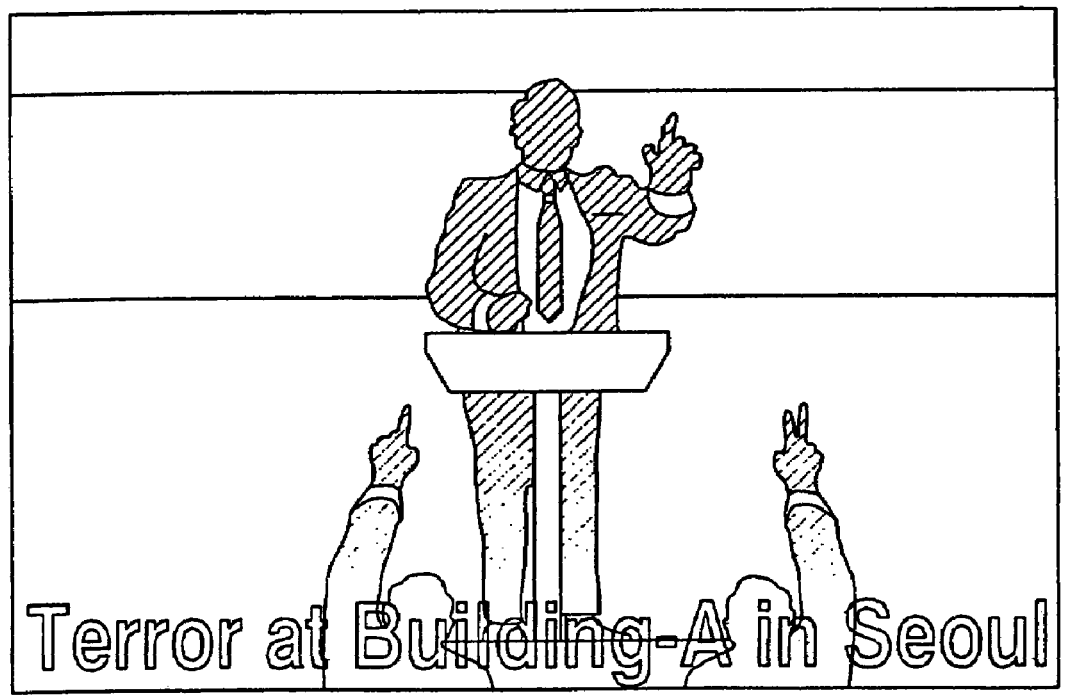
FIG. 11B is a diagram of an displayed image of an emergency alert message according to another embodiment of the present invention.

FIG. 11B is a diagram of an displayed image of an emergency alert message according to another embodiment of the present invention.

Figure 12A:
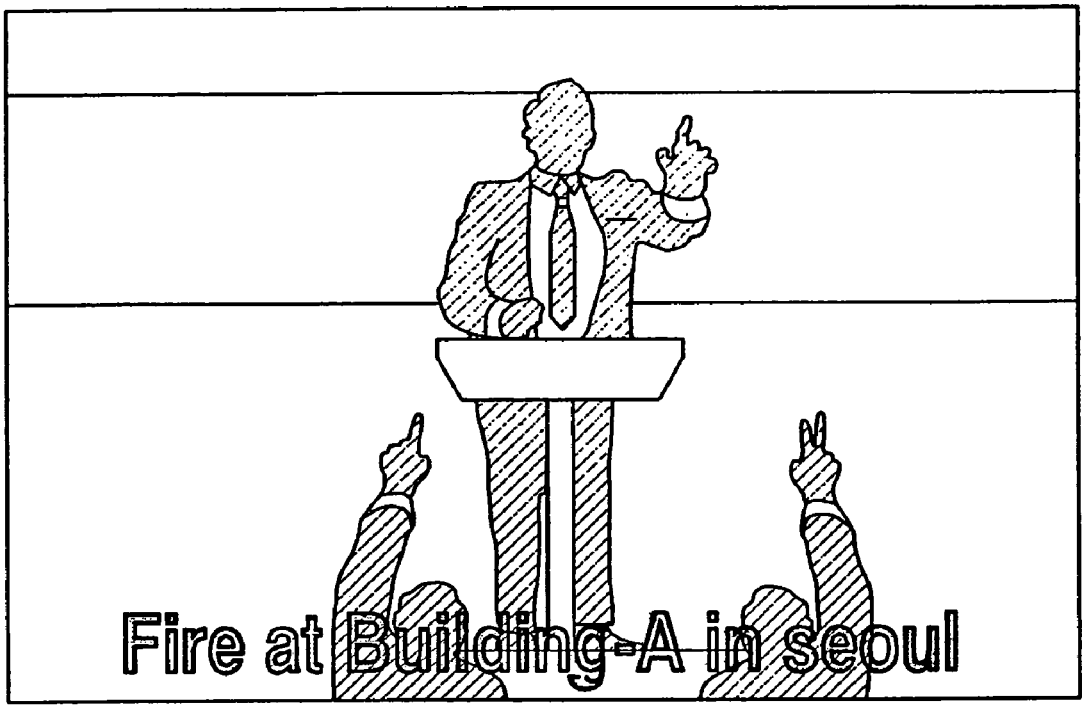
FIG. 12A is a diagram of an displayed image of an emergency alert message according to a further embodiment of the present invention.

FIG. 12A is a diagram of an displayed image of an emergency alert message according to a further embodiment of the present invention.

FIG. 12A is a diagram of an displayed image of an emergency alert message according to a another further embodiment of the present invention.

In the fourth embodiment of the present invention, a method that a terrestrial broadcast receiver receives and analyzes the above-explained EAT, outputs a message associated with an emergency, or is automatically tuned to an emergency channel is explained with reference to FIGS. 10 to 12B as follows.

A terrestrial broadcast receiver 101 includes a tuner 102, a demodulator 103, a demultiplexer 104, an A/V decoder 105, a display unit 106, a PSI/PSIP database 107, a PSI/PSIP decoder 108, a channel manager 109, a channel map 110, an application & UI manager 111, a flash memory 112 and a microcomputer 113 the terrestrial broadcast receiver includes a digital television (DTV) enabling a reception of terrestrial broadcasting or the like for example.

The tuner 102 receives a terrestrial broadcast signal including a PSI/PSIP (program and system information/program and system information protocol) table. Yet, the PSIP table includes an EAT for example. And, an operation of the tuner 102 is controlled by the channel manager 109.

The tuner 102 records a result of receiving the terrestrial broadcast signal in the channel manager 109.

The demodulator 103 is operative in modulating a signal tuned by the tuber 802 into a VSB/EVSB (vestigial side band/enhanced vestigial side band) signal.

The demultiplexer 104 is operative in demultiplexing the signal modulated by the demodulator 803 into audio data, video data and PSI/PSIP table data.

Demultiplexing of the audio/video data is controlled by the channel manager 109. And, demultiplexing of the PSI/PSIP table data is controlled by the PSI/PSIP decoder 108.

The demultiplexed PSI/PSIP table is transferred to the PSI/PSIP decoder 108. The demultiplexed audio/video data is transferred to the A/V decoder 105. And, the A/V decoder 105 decodes the received data.

The PSI/PSIP decoder 108 parses a PSI/PSIP section. The PSI/PSIP decoder 108 reads the rest of actual section data failing in section filtering of the demultiplexer 104 and then records the read data in the PSI/PSIP database 107.

The PSI/PSIP decoder 108 can parse EAT information included in the PSI/PSIP while parsing the PSI/PSIP section. In this case, according to the parsed information, the application & UI manager 111 controls the display unit 106 to output a text associated with an emergency.

The display unit 106 outputs audio or video data and outputs an OSD (on screen display) video.

Yet, while the text associated with the emergency is outputted via the display unit 106, brightness, color and the like of the text are adjusted using an "alert_priority" field value among information included in the EAT (emergency alert table).

For instance, if the "alert_priority" field value is 8 shown in FIG. 2, it is controlled to output the text having a relatively small character size as shown in FIG. 11A. If the "alert_priority" field value is 15 shown in FIG. 2, it means a very significant emergency. Hence, it is controlled to output the text having a relatively large character size as shown in FIG. 11B.

Figure 12B:
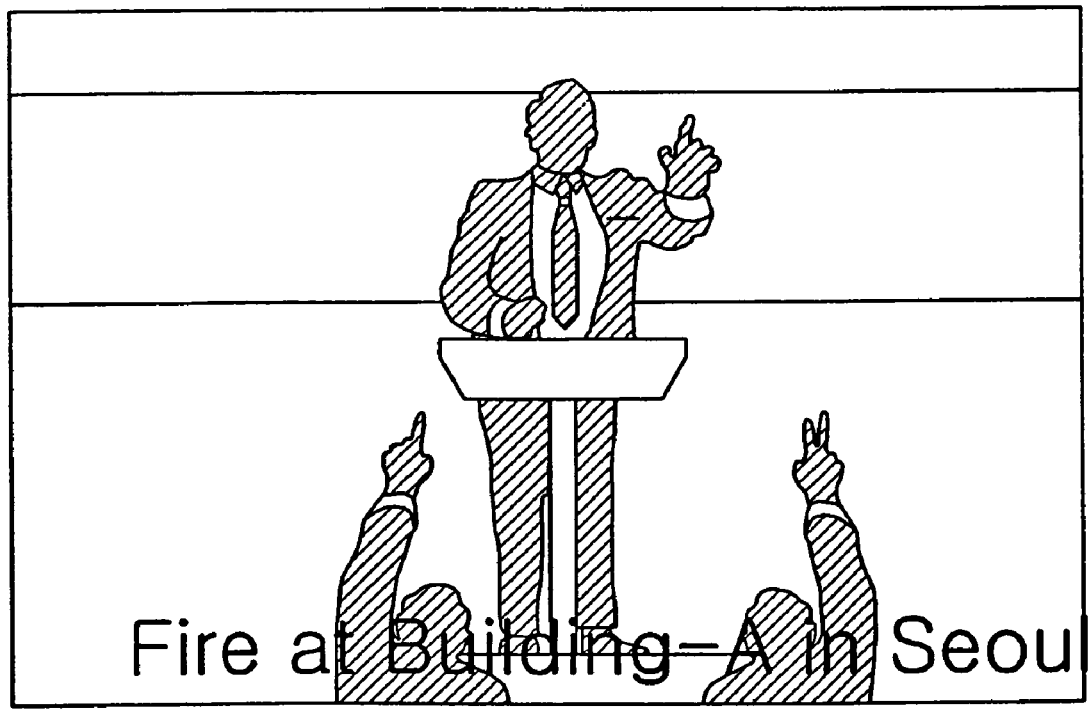
FIG. 12B is a diagram of a displayed image of an emergency alert message according to another further embodiment of the present invention.

For another instance, if the "alert_priority" field value is 8 shown in FIG. 2, it is controlled to output the text configured with characters of relatively thin brightness as shown in FIG. 12A. If the "alert_priority" field value is 15 shown in FIG. 2, it means a very significant emergency. Hence, it is controlled to output the text configured with characters of relatively thick brightness as shown in FIG. 12B.

And, the channel manager 109 controls the tuner 102 to forcibly tune a channel to an emergency channel according to "alert_priority" (priority of an emergency). As mentioned in the foregoing description, the emergency channel can correspond to a conventional terrestrial broadcast channel or can be additionally set to a special frequency channel made to operate in case of an emergency only.

An action of the terrestrial broadcast receiver, and more particularly, an operational process of the terrestrial broadcast receiver in case of a turned-off power is explained with reference to FIG. 9A as follows.

First of all, the microcomputer 113 can be operated in a standby mode while a power of the terrestrial broadcast receiver 101 is turned off. This is because the microcomputer 113 should be in an active mode at least to perform an action of turning on the power and the like according to a power-on signal inputted via a remote controller or local key while the terrestrial broadcast receiver is in the standby mode.

Moreover, other elements are controlled to be operated under the control of the microcomputer 113.

In case that the power of the terrestrial broadcast receiver 101 is turned off, the microcomputer 113 controls the channel manager 109. And, the channel manager 109 controls the tuner 102 to be periodically tuned to a preset emergency alert channel.

And, it is able to decide a presence, or non-presence of an emergency occurrence, a priority and the like by checking an EAT and the like parsed by the PSI/PSIP decoder 108. According to a result of the decision an emergency associated text is outputted via the display unit 106 or the tuner 102 is controlled to be tuned to the emergency alert channel by turning on the power of the terrestrial broadcast receiver.

Meanwhile, terminologies used in the description of the present invention are defined as considering functions in the present invention, which are variable according to usual practice or intentions of those who skilled in the art. Hence, their definitions shall be given based on the overall contents of the present invention.

Accordingly, the present invention provides the following effects.

First of all, news associated with an emergency can be delivered to viewers of all terrestrial broadcasting associated with the emergency not by using all terrestrial broadcast channels to deliver the news but by utilizing a specific frequency channel only. Hence, the present invention can efficiently use the terrestrial broadcast channels.

Secondly, the present invention enables other regular terrestrial broadcasts to be normally broadcast while providing the information of emergency to a viewer. Hence, a user can selectively watch a broadcast associated with an emergency and a regular broadcast.

Thirdly, despite the diversity of terrestrial broadcast channels watched by viewers, the present invention can quickly provide the news associated with an emergency to terrestrial broadcast viewers at the same time point.

Fourthly, if the power of the terrestrial broadcast receiver is in the standby mode or if another data input source (e.g., DVD, etc.) is being outputted, the information indicating that the emergency has taken place can be notified to a user of the terrestrial broadcast receiver.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An emergency alert signaling method for use by a digital television (DTV) receiver, the method comprising:
   determining whether the DTV receiver is on a power-on mode or a power-off mode;
   periodically tuning to a first emergency alert channel to receive a first master guide table when the DTV receiver is on the power-off mode;
   parsing the first master guide table without setting the DTV receiver on the power-on mode to determine whether a new emergency alert message is being received; and
   automatically setting the DTV receiver on the power-on mode and tuning to a second emergency alert channel when the parsed first master guide table indicates that the new emergency alert message is being received.

2. The method of claim 1, wherein the first master guide table includes an emergency flag to indicate whether the new emergency alert message is being received.

3. The method of claim 1, further comprising receiving a first emergency alert table having the new emergency alert message through the tuned emergency alert channel.

4. The method of claim 3, further comprising parsing the new emergency alert message from the first emergency alert table and scrolling the parsed new emergency alert message across a portion of a video screen.

5. The method of claim 1, further comprising:
determining whether the DTV receiver is currently on a terrestrial broadcast mode when the DTV receiver is on the power-on mode;
periodically tuning to the emergency alert channel to receive a second master guide table when the DTV receiver is not on the terrestrial broadcast mode;
parsing the second master guide table to determine whether a new emergency alert message is being received; and
automatically tuning to the emergency alert channel when the parsed second master guide table indicates that the new emergency alert message is being received.

6. The method of claim 5, further comprising receiving a second emergency alert table having the new emergency message through the tuned emergency alert channel.

7. The method of claim 6, further comprising parsing the new emergency alert message from the second emergency alert table and scrolling the parsed new emergency alert message across a portion of a video screen.

8. The method of claim 1, further comprising:
determining whether the DTV receiver is currently on a terrestrial broadcast mode when the DTV receiver is on the power-on mode;
receiving a second master guide table through a terrestrial broadcast channel when the DTV receiver is on the terrestrial broadcast mode;
parsing the second master guide table to determine whether a new emergency alert message is being received; and
automatically tuning to a predefined emergency channel when the parsed second master guide table indicates that the new emergency alert message is being received.

9. The method of claim 8, further comprising receiving a second emergency alert table having the new emergency message through the tuned emergency alert channel.

10. The method of claim 9, further comprising parsing the new emergency alert message from the second emergency alert table and scrolling the parsed new emergency message across a portion of a video screen.

11. An emergency alert signaling method for use by a digital television (DTV) receiver, the method comprising:
determining whether the DTV receiver is on a power-on mode or a power-off mode;
periodically tuning to a first emergency alert channel to receive a first emergency alert table when the DTV receiver is on the power-off mode;
parsing the first emergency alert table without setting the DTV receiver on the power-on mode to determine whether the first emergency alert table includes a new emergency alert message; and
automatically setting the DTV receiver on the power-on mode and tuning to a second the emergency alert channel when the parsed first emergency alert table includes the new emergency message.

12. The method of claim 11, wherein the first emergency alert table includes an information field specifying a sequence number of the new emergency alert message.

13. The method of claim 11, further comprising parsing the new emergency alert message from the first emergency alert table and scrolling the parsed new emergency alert message across a portion of a video screen.

14. The method of claim 11, further comprising:
determining whether the DTV receiver is currently on a terrestrial broadcast mode when the DTV receiver is on the power-on mode;
periodically tuning to the emergency alert channel to receive a second emergency alert table when the DTV receiver is not on the terrestrial broadcast mode;
parsing the second emergency alert table to determine whether the second emergency alert table includes a new emergency alert message; and
automatically tuning to the emergency alert channel when the parsed second emergency alert table includes the new emergency alert message.

15. The method of claim 14, wherein the second emergency alert table includes an information field specifying a sequence number of the new emergency alert message.

16. The method of claim 14, further comprising parsing the new emergency message from the second emergency alert table and scrolling the parsed new emergency alert message across a portion of a video screen.

17. The method of claim 11, further comprising:
determining whether the DTV receiver is currently on a terrestrial broadcast mode when the DTV receiver is on the power-on mode;
periodically tuning to the emergency alert channel to receive a second emergency alert table when the DTV receiver is on the terrestrial broadcast mode;
parsing the second emergency alert table to determine whether the second emergency alert table includes a new emergency alert message; and
automatically tuning to the emergency alert channel when the parsed second emergency alert table includes the new emergency alert message.

18. The method of claim 17, wherein the second emergency alert table includes an information field specifying a sequence number of the new emergency alert message.

19. The method of claim 17, further comprising parsing the new emergency message from the second emergency alert table and scrolling the parsed new emergency alert message across a portion of a video screen.

20. A digital television (DTV) receiver, comprising:
a tuner;
a microcomputer determining whether the DTV receiver is on a power-on mode or power-off mode and controlling operation of the tuner to periodically tune to a first emergency alert channel to receive a first master guide table when the DTV receiver is on the power-off mode; and
a demodulator parsing the first master guide table without setting the DTV receiver on the power-on mode to determine whether a new emergency alert message is being received, wherein the microcomputer automatically sets the DTV receiver on the power-on mode and controls operation of the tuner to tune to a second the emergency alert channel when the parsed first master guide table indicates that the new emergency alert message is being received.

21. The DTV receiver of claim 20, wherein the first master guide table includes an emergency flag to indicate whether the new emergency alert message is being received.

22. The DTV receiver of claim 20, wherein the tuner further receives a first emergency alert table having the new emergency alert message through the tuned emergency alert channel.

23. The DTV receiver of claim 22, wherein the demodulator further parses the new emergency alert message from the first emergency alert table.

24. The DTV receiver of claim 23, further comprising a controller controlling operation of a display device in order to scroll the parsed new emergency alert message across a portion of a video screen.

25. The DTV receiver of claim 20, wherein the microcomputer further determines whether the DTV receiver is currently on a terrestrial broadcast mode when the DTV receiver is on the power-on mode, and further controls operation of the tuner to periodically tune to the emergency alert channel to receive a second master guide table when the DTV receiver is not on the terrestrial broadcast mode.

26. The DTV receiver of claim 20, wherein the microcomputer further determines whether the DTV receiver is currently on a terrestrial broadcast mode when the DTV receiver is on the power-on mode, and further controls operation of the tuner to receive a second master guide table through a terrestrial broadcast channel when the DTV receiver is on the terrestrial broadcast mode.

27. A digital television (DTV) receiver, comprising:
a tuner;
a microcomputer determining whether the DTV receiver is on a power-on mode or a power-off mode and controlling operation of the tuner to periodically tune to a first predefined emergency alert channel to receive a first emergency alert table when the DTV receiver is on the power-off mode; and
a demodulator parsing the first emergency alert table without setting the DTV receiver on the power-on mode to determine whether the first emergency alert table includes a new emergency alert message, wherein the microcomputer automatically sets the DTV receiver on the power-on mode and controls operation of the tuner to tune to a second emergency alert channel when the parsed first emergency alert table includes the new emergency message.

28. The DTV receiver of claim 27, wherein the first emergency alert table includes an information field specifying a sequence number of the new emergency alert message.

29. The DTV receiver of claim 27, wherein the demodulator further parses the new emergency alert message from the first emergency alert table.

30. The DTV receiver of claim 29, further comprising a controller controlling operation of a display device in order to scroll the parsed new emergency alert message across a portion of a video screen.

31. The DTV receiver of claim 27, wherein the microcomputer further determines whether the DTV receiver is currently on a terrestrial broadcast mode when the DTV is on the power-on mode, and controls operation of the tuner to periodically tune to the emergency alert channel to receive a second emergency alert table when the DTV receiver is not on the terrestrial broadcast mode.

32. The DTV receiver of claim 27, wherein the microcomputer further determines whether the DTV receiver is currently on a terrestrial broadcast mode when the DTV receiver is on the power-on mode, and controls operation of the tuner to periodically tune to the emergency alert channel to receive a second emergency alert table when the DTV receiver is on the terrestrial broadcast mode.

33. The method of claim 1, wherein the DTV receiver is on the power-off mode when a broadcast audio and video (AV) stream processing block in the DTV receiver is inactivated.

34. The method of claim 11, wherein the DTV receiver is on the power-off mode when a broadcast audio and video (AV) stream processing block in the DTV receiver is inactivated.

35. The DTV receiver of claim 20, wherein DTV receiver is on the power-off mode when a broadcast audio and video (AV) stream processing block in the DTV receiver is inactivated.

36. The DTV receiver of claim 27, wherein DTV receiver is on the power-off mode when a broadcast audio and video (AV) stream processing block in the DTV receiver is inactivated.

37. The method of claim 1, wherein the first and second emergency channels are same.

38. The method of claim 11, wherein the first and second emergency channels are same.

39. The DTV receiver of claim 20, wherein the first and second emergency channels are same.

40. The DTV receiver of claim 27, wherein the first and second emergency channels are same.

* * * * *

UNITED STATES PATENT AND TRADEMARK OFFICE
CERTIFICATE OF CORRECTION

PATENT NO. : 7,665,106 B2
APPLICATION NO. : 11/583954
DATED : February 16, 2010
INVENTOR(S) : Jin Pil Kim et al.

It is certified that error appears in the above-identified patent and that said Letters Patent is hereby corrected as shown below:

Column 17, claim 11, lines 50-64, should read as follows:

11. An emergency alert signaling method for use by a digital television (DTV) receiver, the method comprising:

determining whether the DTV receiver is on a power-on mode or a power-off mode;

periodically tuning to a first emergency alert channel to receive a first emergency alert table when the DTV receiver is on the power-off mode;

parsing the first emergency alert table without setting the DTV receiver on the power-on mode to determine whether the first emergency alert table includes a new emergency alert message; and automatically setting the DTV receiver on the power-on mode and tuning to a second emergency alert channel when the parsed first emergency alert table includes the new emergency message.

Column 18, claim 20, lines 45-60, should read as follows:

20. A digital television (DTV) receiver, comprising:

a tuner;

a microcomputer determining whether the DTV receiver is on a power-on mode or power-off mode and controlling operation of the tuner to periodically tune to a first emergency alert channel to receive a first master guide table when the DTV receiver is on the power-off mode; and a demodulator parsing the first master guide table without setting the DTV receiver on the power-on mode to determine whether a new emergency alert message is being received, wherein the microcomputer automatically sets the DTV receiver on the power-on mode and controls operation of the tuner to tune to a second emergency alert channel when the parsed first master guide table indicates that the new emergency alert message is being received.

Signed and Sealed this

Sixth Day of April, 2010

David J. Kappos
*Director of the United States Patent and Trademark Office*